(12) United States Patent
Diego Maza et al.

(10) Patent No.: US 10,805,225 B2
(45) Date of Patent: Oct. 13, 2020

(54) METHODS FOR THE PROCESSING OF DATA PACKETS, CORRESPONDING DEVICE, COMPUTER PROGRAM PRODUCT, STORAGE MEDIUM AND NETWORK NODE

(71) Applicant: Orange, Paris (FR)

(72) Inventors: William David Diego Maza, Chatillon (FR); Isabelle Hamchaoui, Tregastel (FR); Fabrice Guillemin, Pleumeur-Bodou (FR)

(73) Assignee: ORANGE, Paris (FR)

( * ) Notice: Subject to any disclaimer, the term of this patent is extended or adjusted under 35 U.S.C. 154(b) by 245 days.

(21) Appl. No.: 15/779,725

(22) PCT Filed: Nov. 16, 2016

(86) PCT No.: PCT/EP2016/077876
§ 371 (c)(1),
(2) Date: May 29, 2018

(87) PCT Pub. No.: WO2017/093022
PCT Pub. Date: Jun. 8, 2017

(65) Prior Publication Data
US 2020/0162398 A1 May 21, 2020

(30) Foreign Application Priority Data

Nov. 30, 2015 (FR) ...................................... 15 61613

(51) Int. Cl.
*H04L 12/863* (2013.01)
(52) U.S. Cl.
CPC .............................. *H04L 47/6255* (2013.01)

(58) Field of Classification Search
CPC ......... H04L 47/10; H04L 47/20; H04L 47/21; H04L 47/22; H04L 47/125; H04L 47/625; H04L 47/6255; H04L 47/6275
See application file for complete search history.

(56) References Cited

U.S. PATENT DOCUMENTS 6,167,027 A * 12/2000 Aubert ................ H04L 12/2854
370/230
10,412,634 B2 * 9/2019 Dudda .................. H04L 47/823
(Continued)

OTHER PUBLICATIONS

French Search Report and French Written Opinion dated Aug. 2, 2016 for French Application No. 1561613.
(Continued)

*Primary Examiner* — Mewale A Ambaye
(74) *Attorney, Agent, or Firm* — David D. Brush; Westman, Champlin & Koehler, P.A.

(57) ABSTRACT

A method is proposed for processing of data packets received by an upstream node and intended for transmission to a terminal by a downstream node. The upstream node includes a queue of non-priority data packets intended for the terminal. The method includes: obtaining a first piece of information representing a filling state of the above-mentioned queue over a predetermined period of observation; when the first piece of information obtained has a value indicating a filling level of the queue that is lower than or equal to a first predetermined non-zero low threshold, reducing a rate of departure from the queue; when the first piece of obtained information has a value indicating a filling level of the queue that is higher than a first predetermined high threshold higher than or equal to the first low threshold, increasing the rate of departure from the queue.

10 Claims, 5 Drawing Sheets

(56) References Cited

U.S. PATENT DOCUMENTS

| | | | | |
|---|---|---|---|---|
| 2004/0062259 A1* | 4/2004 | Jeffries | .................. | H04L 47/32 370/412 |
| 2004/0218617 A1* | 11/2004 | Sagfors | .............. | H04L 49/9078 370/412 |
| 2012/0063493 A1* | 3/2012 | Hasegawa | ............. | H04L 47/263 375/211 |
| 2013/0304934 A1* | 11/2013 | Joch | ...................... | H04L 65/607 709/231 |
| 2014/0105218 A1* | 4/2014 | Anand | ................ | H04L 47/6255 370/412 |
| 2014/0321275 A1 | 10/2014 | Anand | | |

OTHER PUBLICATIONS

Blake et al. "An Architecture for Differentiated Services." Network Working Group, RFC 2475. Dec. 1998.

"Digital cellular telecommunications system (Phase 2+); Universal Mobile Telecommunications System (UMTS); LTE; Quality of Service (QoS) concept and architecture (3GPP TS 23.107 version 8.2.0 Release 8." ETSI TS 123 107 v8.2.0. Jan. 2012.

Nichols et al. "Controlling Queue Delay." ACM Queue, vol. 10, No. 5. May 2012.

Pan et al. "PIE: A Lightweight Control Scheme to address the Bufferbloat Problem." IEEE International Conference on High Performance Switching and Routing 2013, p. 148-155.

English Translation of Written Opinion of the International Searching Authority dated Jan. 31, 2017 for corresponding International Application No. PCT/EP2016/077876, filed Nov. 16, 2016.

International Search Report dated Jan. 31, 2017 for corresponding International Application No. PCT/EP2016/077876, filed Nov. 15, 2016.

Written Opinion of the International Searching Authority dated Jan. 31, 2017 for corresponding International Application No. PCT/EP2016/077876, filed Nov. 16, 2016.

* cited by examiner

METHODS FOR THE PROCESSING OF DATA PACKETS, CORRESPONDING DEVICE, COMPUTER PROGRAM PRODUCT, STORAGE MEDIUM AND NETWORK NODE

CROSS-REFERENCE TO RELATED APPLICATIONS

This Application is a Section 371 National Stage Application of International Application No. PCT/EP2016/077879, filed Nov. 16, 2016, which is incorporated by reference in its entirety and published as WO 2017/093022 A1 on Jun. 8, 2017, not in English.

TECHNICAL FIELD

The present invention relates to the field of the transmission of data packets within a network, from an upstream node (or node device) to a customer terminal via a downstream node having a communications link (for example a radio communications link) of variable and limited bandwidth, leading to the customer terminal.

More specifically, the present invention relates to the management of the quality of service experienced by the customer terminal in such a configuration.

TECHNOLOGICAL BACKGROUND

At present, the management of the quality of service experienced by an end-user is still essentially the responsibility of operators possessing access networks. Indeed, since they are costlier and unable to benefit from very significant statistical dimensioning, these access networks are often "narrow" and are the sites of congestion. The natural place in which to situate the mechanisms that can mitigate the deterioration caused by this congestion is therefore clearly the corresponding bottlenecks, where it is easy to prioritize streams and distribute resources or scarcity.

In fixed networks, quality-of-service management policies are currently implemented at the point of access and enables certain streams to be prioritized over others considered to be less crucial in terms, for example, of the properties of the Internet protocol. An example that can be cited is that of the "DiffServ" technique described in the document "RFC 2475—An Architecture for Differentiated Services—December 1998". Many complementary mechanisms are used to carry out most of the quality-of-service management policies that can be envisaged, from simple stream prioritization to the setting up of bandwidth guarantees.

Despite the maturity of fixed networks, it is observed however that they continue to contain entities devoid of such packet prioritization mechanisms. This is for example the case with old-generation digital subscriber line access multiplexers (or DSLAMs) or with the equipment of radio stations in certain radio-relay systems. It can also be seen that these entities often constitute network bottlenecks in terms of flow.

As an illustration, FIG. 1 presents such a known configuration in a fixed network where the downstream node 101 is an access multiplexer providing access to the digital subscriber line which does not implement quality-of-service management functions. For example, the downstream node does not manage the layer 3 of the OSI (Open Systems Interconnection) stack. It therefore cannot read the information of the header of an Internet data packet indicating a level of priority of this packet, such as for example the DSCP (Differentiated Services Code Point). Thus, all the packets 110, 111 received by the downstream node 101 and intended for the end-user's terminal 102 are managed in one and the same queue 123, for example of the FIFO (First In First Out) type. On the contrary, the upstream node 100, for example a wideband access service or a broadband remote access server (BRAS) implements such quality-of-service management functions (the upstream node for example manages the layer 3 of the OSI stack). The result of this, in this example, is that the packets 110, 111 received by the upstream node 100 addressed to the end-user's terminal 102 are managed in two distinct queues 120, 121 depending on a criterion of priority, for example the DSCP marking of their header if they are Internet packets.

However, since the flow rate 103 of the downstream node 101 is lower than the flow rate 104 of the upstream node 100, the queues 120, 121 of the upstream node become empty, thereby preventing any differentiated management of these packets in the upstream node. The packets of different levels of importance 110, 111 are then managed alike in the same queue 123 in the downstream node which does not implement quality-of-service management functions.

In this configuration, it can be seen that the quality of service can only be managed end to end between the customer and the server, for example through the implementing of a TCP (transmission control protocol) type protocol. This trend is gradually eliminating access operators by limiting them to the role of connectivity providers.

The same set of problems exists in the case of cell networks. Indeed, the standardizing organizations have defined quality-of-service management solutions such as for example the one described in the standardizing document "3GPP, "QoS Concept and Architecture," TS 23.107 version 8.2.0 Release 8, 2011". In practice, these solutions propose the ensuring of a certain level of quality of service for certain applications, especially through a guaranteed flow rate. However, this mode of quality-of-service management appears to be not only costly but also difficult to exploit. These functions are therefore very rarely deployed in present-day networks despite their availability in devices.

Besides, the functions conventionally encountered in fixed Internet networks which are simpler and appreciably less costly, are absent in the mobile access networks, especially in the bottleneck points (i.e. in the antennas or base stations). It can thus be seen that the configuration described with reference to FIG. 1 can also be encountered in prior-art cell networks, the downstream node 101 then representing for example an antenna or a base station of the network, and the upstream node 100 representing a PG-W type packet data network gateway, or a C-GW (Convergent Gateway) type fixed/convergent gateway.

As in the case of fixed networks, most applications software programs require a controlled level of quality of service in mobile networks implementing end-to-end mechanisms, for example through the use of the TCP protocol.

However, in the case of mobile networks, the problem of rapid fluctuation of the flow rate on the radio link gets added to the problem of the reduction of the flow rate on the last section of the network, i.e. between the last node and the user. This fluctuation appreciably impairs the efficiency of the TCP type end-to-end solutions which often show excessively low reactivity.

There is therefore a need for a solution enabling access operators to manage the quality of service experienced by a user of an application receiving data packets travelling through their networks.

There is also a need to improve the quality of service in the implementation of TCP type end-to-end solutions.

SUMMARY

In one embodiment of the invention, a method is proposed for the processing of data packets received by a network node (or node device) called an upstream node and intended for transmission to a terminal (or terminal device) by means of a network node known as a downstream node through a communications link, said upstream node comprising a queue of non-priority data packets intended for said terminal, capable of storing a predetermined number of data packets before they are transmitted to the downstream node. Said method comprises the following steps:
   obtaining a first piece of information representing a filling state of said queue of the upstream node over a predetermined period of observation;
   when said first piece of information obtained has a value indicating a filling level of the queue that is lower than or equal to a first predetermined non-zero low threshold, reducing a rate of departure from said queue;
   when said first piece of obtained information has a value indicating a filling level of the queue that is higher than a first predetermined high threshold higher than or equal to said first low threshold, increasing the rate of departure from said queue.

Thus, the invention proposes a novel and inventive solution to enable the control of the quality of service experienced by an end-user through the control of the departure rate of the packets sent by a network upstream node intended for this end-user via a downstream node.

To this end, the invention provides that this control will be carried out at the level of this upstream node possessing quality-of-service capacities enabling the management of different queues as a function of the size of the packets addressed to the end-user.

The invention also provides for keeping the corresponding queues non-empty by controlling their departure rate. Thus, priority can be arbitrated between the departure rates of the different queues according to the priority of the packets that they contain, the rate of the queues of the non-priority packets being preferably reduced.

When several queues are used to manage the non-priority packets intended for the end-user, for example if more than two priority levels are present in these packets, then the present method can be applied equally well to each of these queues or to some of them.

Besides, the use of two distinct thresholds to determine whether the departure rate of the packet should be reduced or increased makes it possible, through a hysteresis effect, to overcome the consequences of undesirable oscillations within the computed value of this departure rate. This also makes it possible to smoothen the rate experienced by the end-user and therefore to obtain averages of sudden changes in rate which can occur when this user is using a mobile radio terminal for example.

According to one particular characteristic, said first piece of information representing a filling state of said queue is obtained by means of a method of active queue management.

Thus, the queue filling state can be determined through a method of active queue management well known to those skilled in the art for its efficiency in this field.

According to one particular characteristic, said first piece of information belongs to the group comprising:
   an estimation of a time taken to pass through or cross said queue by one or more data packets over said predetermined period of observation;
   an estimation of a filling level of said queue over said predetermined period of observation.

Thus, the queue filling state is determined either indirectly through the observation of a time of passage through the queue or directly through the observation of a filling level.

In one particular implementation, the method furthermore comprises the following sub-steps:
   when said first piece of obtained information has a value indicating a filling level of the queue higher than said first high threshold:
      obtaining a second piece of information representing a present instant; and
      when said second piece of information obtained represents a present instant prior to a preliminarily determined date, reducing or maintaining said rate of departure from said queue;
      when said second piece of information obtained represents a present instant after or equal to said preliminarily determined date, executing said step for increasing the rate of departure from said queue.

Thus, in this particular implementation, the flow rate in the non-priority queue, once reduced by the method according to the invention, can be re-increased only after a certain period of time. In particular, when only one threshold is used to determine both whether the departure rate of the packets should be diminished or increased, this gives an additional possibility of eliminating any effect of oscillation in the departure rate of the data packets as well as smoothing the flow rate experienced by the end-user.

The implementation, with only one threshold, of the algorithm for managing the departure rate of the packets sent out by an upstream node of the network is furthermore simplified, leading to an implementation that is simple and robust and can also be easily parameterized.

According to one particular characteristic of the invention, said rate of departure from said queue is a function of the arrival rate of the packets entering said queue.

Thus, the rate of departure from the queue to which the method according to the invention is applied is computed so as to make sure that it is filled in a way that tends to be constant.

According to one particular aspect of the invention, said arrival rate of the packets entering said queue depends, through a method for managing the end-to-end quality of service, on the rate of departure from said downstream node.

Thus, the arrival rate of the packets entering the queue depends on the minimum flow rate in the network, for example the rate of departure from the downstream node. This is possible when a method for managing the end-to-end quality of service, for example of the TCP type, is implemented. Such a method indeed, through acknowledgements of reception, adapts the flow rate in the source to the flow rate effectively received by the end-user and therefore to the minimum flow rate in the network in practice. Thus, since the rate of departure from the queue to which the method according to the invention is applied is furthermore automatically linked (or enslaved) to its arrival rate, this departure rate is thereby also automatically linked to the minimum flow rate in the network, in practice the flow rate in this last node before the end-user.

In a first implementation, said upstream node is a wideband access server and said downstream node is a digital subscriber line access multiplexer.

Thus, in this first implementation, the upstream node is a fixed network node possessing quality-of-service functions so that it can manage different queues according to the priority of the data packets intended for an end-user, for example through OSI layer 3 processing capacities. Conversely, the downstream node does not have such functions (its functions are limited for example to OSI layer 2 processing capacities). This downstream node then cannot manage the different queues.

In a second implementation, said upstream node is a packet data network gateway or a convergent gateway and said downstream node is an antenna or a base station.

Thus, in this second implementation, the method can be applied to a mobile network upstream node possessing quality-of-service functions such that it is capable of managing different queues as a function of the priority of the data packets intended for an end-user, for example through OSI layer 3 processing capacities. Conversely, the downstream node does not have such functions (its functions are limited for example to an OSI layer 2 processing capacity) and therefore cannot manage different queues.

According to another embodiment of the invention, there is proposed a computer program product comprising program code instructions for implementing a method as described here above, in any one of its different embodiments, when said program is executed on a computer.

In another embodiment of the invention, there is proposed a computer-readable and non-transient storage medium storing a computer program comprising a set of program code instructions for the implementing of a method as described here above according to any one of its embodiments.

In another embodiment of the invention, a processing device is proposed, configured to implement a method for processing data packets received by a network node called an upstream node and intended to be transmitted to a terminal by a network node called a downstream node device through a communications link, said upstream node comprising a queue of non-priority data packets intended for said terminal, capable of storing a predetermined number of data packets before their transmission to the downstream node. The device comprises a reprogrammable computing machine and a dedicated computation machine configured for:
  obtaining a first piece of information representing a filling state of said queue of the upstream node over a predetermined period of observation;
  reducing a rate of departure from said queue when said first piece of information obtained has a value indicating a filling level of the queue lower than or equal to a first predetermined non-zero low threshold;
  increasing said rate of departure from said queue when said first piece of information obtained has a value indicating a filling level of the queue higher than a first predetermined high threshold higher than or equal to said first low threshold.

Thus, the invention also proposes a processing device capable of implementing the method for processing data packets according to the invention (according to any one of the different embodiments mentioned here above).

In another embodiment of the invention, there is proposed a network node, called an upstream node, configured to implement a method for processing data packets as described here above according to any one of its embodiments, the upstream node comprising a processing device as described here above.

Thus, the invention also proposes a network node capable of implementing the method for processing data packets according to the invention (according to any one of the different embodiments mentioned here above).

LIST OF FIGURES

Other features and advantages shall appear more clearly from the following description of particular embodiments of the disclosure, given by way of simple illustratory and non-exhaustive examples and from the appended drawings, of which:

DETAILED DESCRIPTION

In all the figures of the present document the identical elements and steps are designated by a same reference.

The general principle of the technique described consists in deliberately reducing the flow rate in a network node possessing capacities to prioritize certain streams over others considered to be less crucial. More specifically, the technique described proposes to set up an automatic link between the departure rate of the packets sent out by this node and their entry or arrival rate. This arrival is itself automatically linked to the flow rate in a downstream node, for example the downstream node having the lowest flow rate in the network and transmitting packets to the end-user through a method for the management of end-to-end quality of service. As a result, the upstream node will become the bottleneck, in terms of flow rate, for the transmission of the data packets addressed to the end-user in question. The result of this is that the queues of this upstream node get filled and that the flow rate related to these different queues can then be regulated. The prioritizing of certain streams over others can then become effective, for example by reducing, on a priority basis, the stream of packets considered to have the lowest priority.

Figure 2A:
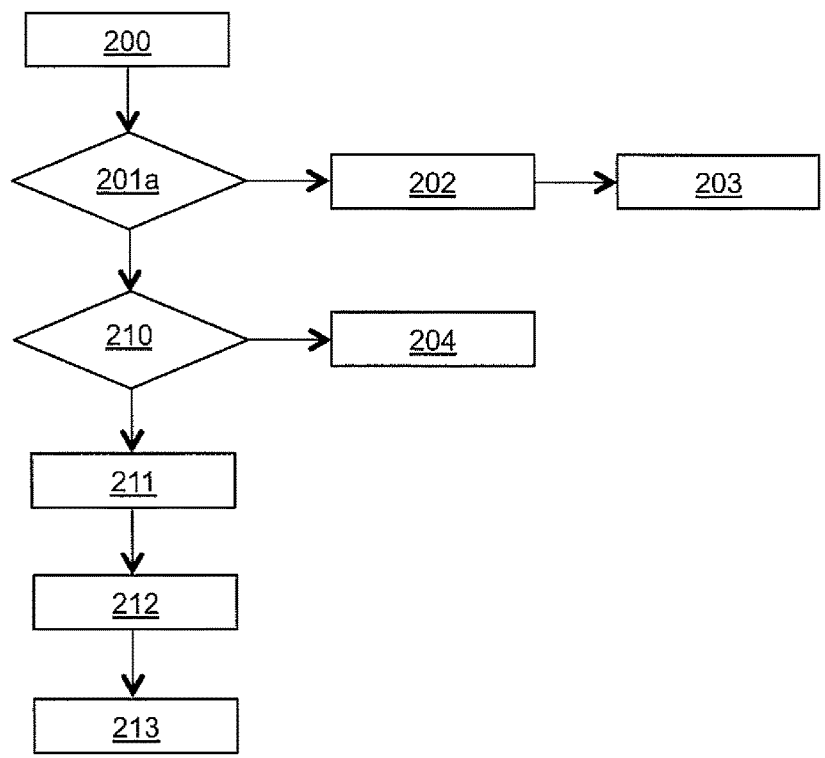
FIGS. 2a and 2b illustrate the steps of a method for processing data packets according to different embodiments of the invention.
Figure 2B:
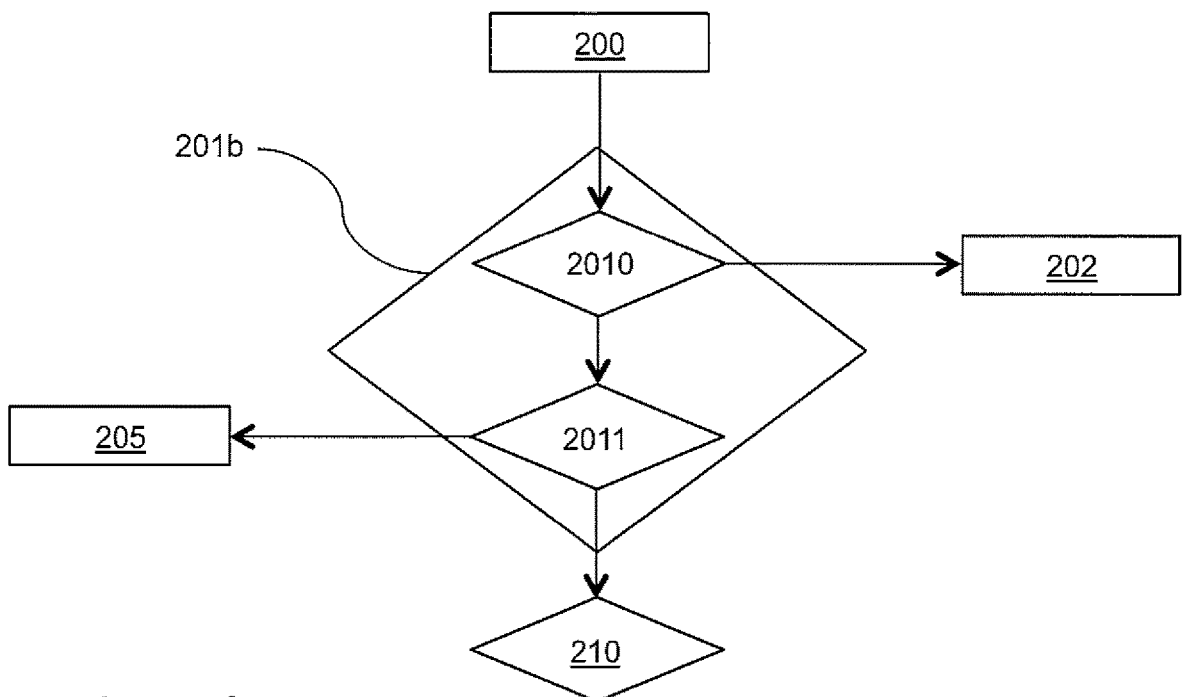
Figure 2C:
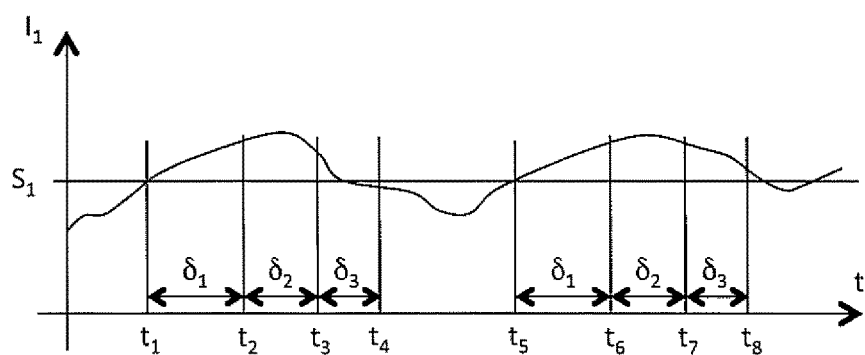
FIGS. 2c and 2d illustrate parameters coming into play in the implementation of the data packet processing method with reference to the embodiments represented in FIGS. 2a and 2b.

Referring to FIGS. 2a and 2c, we now describe one embodiment of a method for processing data packets according to the invention.

According to this embodiment, the flow rate in at least one queue of non-priority data packets of a network of the node is computed by using an active queue management algorithm of the modified AQM (Active Queue Management) type.

Indeed, certain active queue management algorithms according to prior-art techniques are used to control the waiting times of packets in the queue considered by destroying some of them when these waiting times become excessively lengthy. More specifically, when the waiting time increases, these algorithms determine whether packet-destroying actions are required and which packets should be destroyed.

Different types of active queue management algorithms exist and are well known to those skilled in the art. Example that can be cited are the PIE (Proportional Integral controller Enhanced) algorithm such as the one presented by Preethi Natarajan, Chiara Piglione, Mythili Suryanarayana Prabhu, Vijay Subramanian, Fred Baker and Bill VerSteeg in: "PIE: A lightweight control scheme to address the bufferbloat problem" (IEEE International Conference on High Performance Switching and Routing 2013, p 148-155) or else again the CoDel ("COntrolled DELay management") as presented by Kathleen M. Nichols and Van Jacobson in "Controlling Queue Delay" (ACM Queue, Vol. 10 Issue 5, May 2012).

According to one embodiment of the invention, such algorithms can be used not to decide whether the packets must be destroyed but to decide whether the flow rate in the queue has to be reduced or increased. More particularly, the embodiment presented with reference to FIG. 2a is based on the use of a CoDel type algorithm.

Thus, in a first step 200, a packet is removed from a queue of a node known as an upstream node to be sent to a node known as a downstream node in the network.

At this time, during a step 201a, a first piece of information $I_1$ representing the filling state of this queue is compared with a first threshold $S_1$.

This first piece of information $I_1$ can for example be an estimation of the time taken by this packet that has just been removed to pass through this queue. This can also be an estimation of a time taken to pass through this queue by any other packet that has already been removed from the queue. Again, it can again be imagined that it is an average crossing time estimated for all or part of the packets removed from the queue during a given period or again any other statistic based on the crossing time of these packets. The term "crossing time of a packet" is understood here to mean the difference in time between the instant of arrival of this packet in the queue (obtained by means of a time stamp for example) and the instant of removal of the same packet from the same queue.

As an alternative, this first piece of information $I_1$ can correspond to an estimation of the filling level of the queue (for example the average level, the minimum level, the maximum level or any other statistic on the filling of the queue) over a predetermined observation period.

In one example of implementation, a threshold value $S_1$ corresponding to a crossing time of 15 ms is used. This is compatible with most queues used.

If, during the step 201a, the value of this first piece of information $I_1$ is lower than or equal to the first predetermined threshold $S_1$, then a step 202 is executed during which an index k is reset at an initial value $k_0$. This index is furthermore used during steps 211 and 212 described here below. This step 202 is then followed by the step 203 during which the rate of departure from the queue is reduced. For example, this reduction can take the form of a computation of the departure rate $C_n$ to be applied to the queue after the iteration n of the algorithm as a function of the departure rate $C_{n-1}$ applied before this iteration. In other words, a function g links the departure rate of the packets of the queue situated before, i.e. $C_{n-1}$, and after, i.e. $C_n$, the passage through the step 202. This function g then enables the definition of a law of progression of this departure rate of the packets from the queue during the reduction of this departure rate. For example, this reduction of departure rate can be done linearly, polynomially, exponentially, etc.

Thus, if the first piece of information $I_1$ is lower than or equal to the first threshold $S_1$, i.e. if the crossing time in the queue is too small, the algorithm will tend to reduce the computed rate of departure from the queue in order to fill this queue.

Conversely if, during the step 201a, the value of the first piece of information is higher than the first predetermined threshold, the algorithm passes to the step 210 during which a second piece of information is compared with a second variable threshold $S_2$. According to the present embodiment, this second piece of information represents the present instant at the time of execution of the step 210 and the second threshold corresponds to a second initial date value or else to a date determined during a previous passage to the step 212.

If, during the step 210, the value of the second piece of information is higher than or equal to the second threshold $S_2$, the algorithm passes to the step 211 during which the integer index k is incremented, for example by one unit.

The step 211 of incrementation of the index k is then followed by the step 212 during which the value of the second threshold $S_2$ is updated. For example, this second threshold $S_2$ is determined on the basis of a modified CoDel algorithm. More specifically, this second threshold can be determined as a function of the following: the present instant $t_p$ at the time of execution of the step 212, a constant value representing a time interval Inter, and the index k described here above with reference to the step 211. In the present embodiment, the second threshold $S_2$ can be expressed in the form of a sum, e.g. $t_p+\delta$ with $\delta=\text{Inter}/\sqrt{k}$.

The step 212 for determining the second threshold $S_2$ is then followed by the step 213 during which the rate of departure from the queue is increased. Just as in the case of the reduction of the departure rate described here above with reference to the step 203, the departure rate $C_n$ to be applied to the queue after the iteration n of the algorithm can be expressed as the function $f$ of the departure rate $C_{n-1}$ applied before this iteration. Here again, the function $f$ (of a linear, polynomial or exponential type for example) can be used to define a law of progression of this rate of removal of the packets from the queue when this rate is increased.

Conversely, if during the step 210 the value of this second piece of information is lower than the second threshold $S_2$, the algorithm passes to the step 204 during which the rate of departure from the queue is reduced. In one variant, this rate can be simply maintained during the passage to the step 204. This would be with the aim of not having the queue filled even further when the test performed at the step 201a was already positive.

In the example illustrated in FIG. 2c, it is at the instant $t_1$ that the first piece of information $I_1$ becomes for the first time higher than the first threshold $S_1$ (i.e. the time take to cross the queue becomes excessively great). At this instant $t_1$, the test performed at the step 201a is positive and the step 210 is executed for the first time. During the execution of this step 210, the second threshold $S_2$ takes an initial value which is written as: $S_2=t_1+\delta_1$ with $t_1=t_p$ and $\delta_1=\text{Inter}/\sqrt{k_0}$ (where $k_0$ is the initial value of the index k determined at the step 202). The instant $t_1$ is herein likened to the instant $t_p$ of execution of the step 212 in considering the execution times of the steps of the method to be negligible.

Later (at the instant $t_2$), when the second piece of information (representing the present instant at the time of execution of the step 210) becomes higher than or equal to the second threshold $S_2=t_1+\delta_1$, the first piece of information $I_1$ is even higher than the first threshold $S_1$. The steps 212 to 213 (leading to a first reduction of the rate of departure from the queue) are then executed for the first time. In particular, a new value of the second threshold $S_2$ (intended for use during the next execution of the step 210) is computed during the first execution of the step 212, at the instant $t_p$, and is written as: $S_2=t_2+\delta_2$ with $t_2=t_p$ and $\delta_2=\text{Inter}/\sqrt{k_0+1}$.

Even later (at the instant $t_3$), when the second piece of information (representing the present instant at the time of execution of the step 210) becomes higher than or equal to the second threshold $S_2=t_2+\delta_2$, the first piece of information $I_1$ is even higher than the first threshold $S_1$. The steps 211 to 213 (leading to a second reduction of the rate of departure from the queue) are then executed for the second time. In particular, a new value of $S_2$ is computed during the second execution of the step 212, at the instant $t_p$, and is written as: $S_2=t_3+\delta_3$ with $t_2=t_p$ and $\delta_3=\text{Inter}/\sqrt{k_0+2}$.

Even later (at the instant $t_4$), when the second piece of information (representing the present instant at the time of execution of the step 210) becomes higher than or equal to the second threshold $S_2=t_3+\delta_3$, the first piece of information $I_1$ is kept lower than or equal to the first threshold $S_1$. The steps 211 to 213 are not executed a third time in this case. Instead, the steps 202 and 203 are now executed, leading on the one hand to the setting at the initial value $k_0$ of the index k, and on the other hand to a controlled reduction of the rate of departure from the queue.

It is then necessary to reach the instant $t_5$ so that the first piece of information $I_1$ again becomes higher than the first threshold $S_1$, thereby leading to a new execution of the step 210. However, since the value of the index k has been reset at the initial value $k_0$, the second threshold $S_2$ is then written as follows: $S_2=t_5+\delta_1$ with $t_5=t_p$ and $\delta_1=\text{Inter}/\sqrt{k_0}$.

It is seen then that the conditions are the same for the two following executions of the steps 211 to 213, each leading to a reduction of the rate of departure from the queue at the instants $t_6=t_5+\delta_1$ and $t_7=t_6+\delta_2$, as for those encountered during the execution of these steps at the instants $t_2=t_1+\delta_1$ and $t_3=t_2+\delta_2$.

Later (at the instant $t_g$), the first piece of information $I_1$ is still higher than the first threshold $S_1$ when the second piece of information (representing the present instant at the time of execution of the step 210) becomes higher than or equal to the second threshold $S_2=t_7+\delta_3$. Thus, the steps 211 to 213, leading to a controlled reduction of the rate of departure from the queue are executed once again at the instant $t_3$, which was not the case previously when the instant $t_4$ was reached.

Thus, through the sequencing of the steps described here above, it can be seen that, even if the first piece of information $I_1$ is higher than the first threshold $S_1$, i.e. if the crossing time in the queue becomes too great, the algorithm will increase the flow rate only if the second piece of information representing the present instant at the time of execution of the step 210 is higher than or equal to the second threshold $S_2$, i.e. if sufficient time has elapsed since the previous increase in flow rate. Consequently, any phenomenon of fast oscillation of the flow rate around a value of equilibrium is impossible. Conversely, even when the aim of the algorithm remains the reduction of the effective flow rate in the queue relative to its physical flow rate in order to get fixed on the lowest flow rate in the network, the algorithm all the same makes it possible again to increase this departure rate to adapt to the variations of this minimum flow rate. This increase is of course possible only within the limits of the physical flow rate in the queue which remains the upper limit possible for this departure rate.

According to this embodiment of a method according to the invention, it can be seen that the flow rate in the queue is computed so that the filling level of this queue tends to be constant. Thus, once a point of equilibrium is reached, the departure rate computed by the algorithm tends to be equal to the flow rate of packets entering the queue. However, in one application where a protocol for the management of the end-to-end quality of service, for example of the TCP type, is present it can be seen that this flow rate of arriving packets corresponds, after a period of adaptation, to the minimum flow rate in the network. Indeed, such an end-to-end protocol tends to make the flow rate in the source of the packets correspond to the flow rate effectively received by the intended recipient. Thus, the algorithm described with reference to FIG. 2a makes it possible to replicate this minimum flow rate in the network in the queue of the node to which it is applied.

Figure 2D:
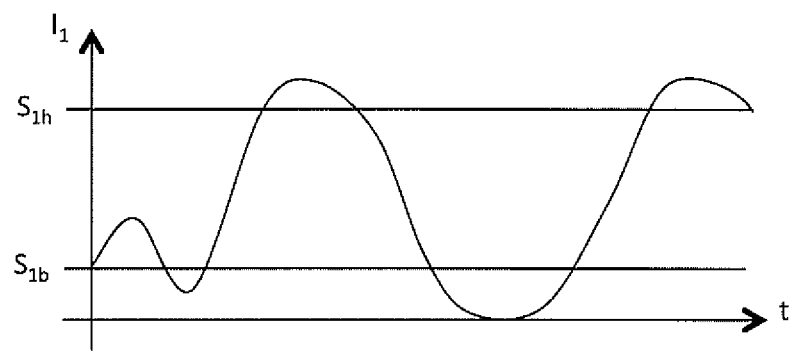

Referring to FIGS. 2b and 2d, we now describe a variant of an embodiment of the method for processing data packets according to the invention. In this variant, during a step 201b, the first piece of information $I_1$ representing the filling state of the queue is compared not to a single first threshold as during the step 201a described with reference to FIG. 2a but to a first high threshold $S_{1h}$ as well as to a first low threshold $S_{1b}$. In one particular implementation, the value of the low threshold $S_{1b}$ corresponds to a crossing time of 5 ms, which is compatible with most of the queues used. Similarly, it can be planned to have a high threshold $S_{1h}$ corresponding to this crossing time of 20 ms.

More specifically, during a sub-step 2010, the first piece of information $I_1$ is compared to a first predetermined low threshold $S_{1b}$. If the value of this first piece of information $I_1$ is lower than or equal to the first predetermined threshold $S_{1b}$, then the step 202 described with reference to FIG. 2a is executed.

Conversely, if the value of the first piece of information $I_1$ is higher than the first predetermined low threshold $S_{1b}$, then during a sub-step 2011, the first piece of information $I_1$ is compared with a first predetermined high threshold $S_{1h}$, this first high threshold being higher than or equal to the first low threshold $S_{1b}$. If the value of the first piece of information $I_1$ is higher than the first predetermined high threshold $S_{1h}$, the step 210 described with reference to FIG. 2a is executed. Conversely, if the value of the first piece of information $I_1$ is lower than or equal to the first predetermined high threshold $S_{1h}$, then the rate of departure from the queue is kept constant during a step 205. Thus, the departure rate is kept constant throughout a range of values of the first piece of information representing the filling state of the queue. The computed value of the flow rate is then modified less frequently. The rate of departure from the queue is thus more stable in this embodiment.

In this variant, the other steps of the method for processing data packets according to the invention correspond to the steps described here above with reference to FIG. 2a.

Figure 3A:
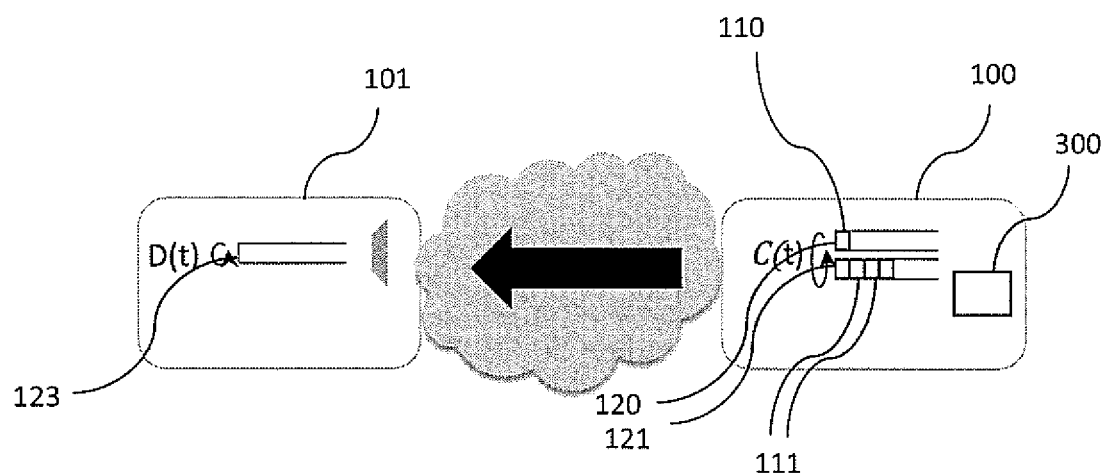
FIGS. 3a and 3b illustrate the effects of a data packet processing method on the filling of the queues of the network nodes according to particular embodiments of the invention.
Figure 3B:
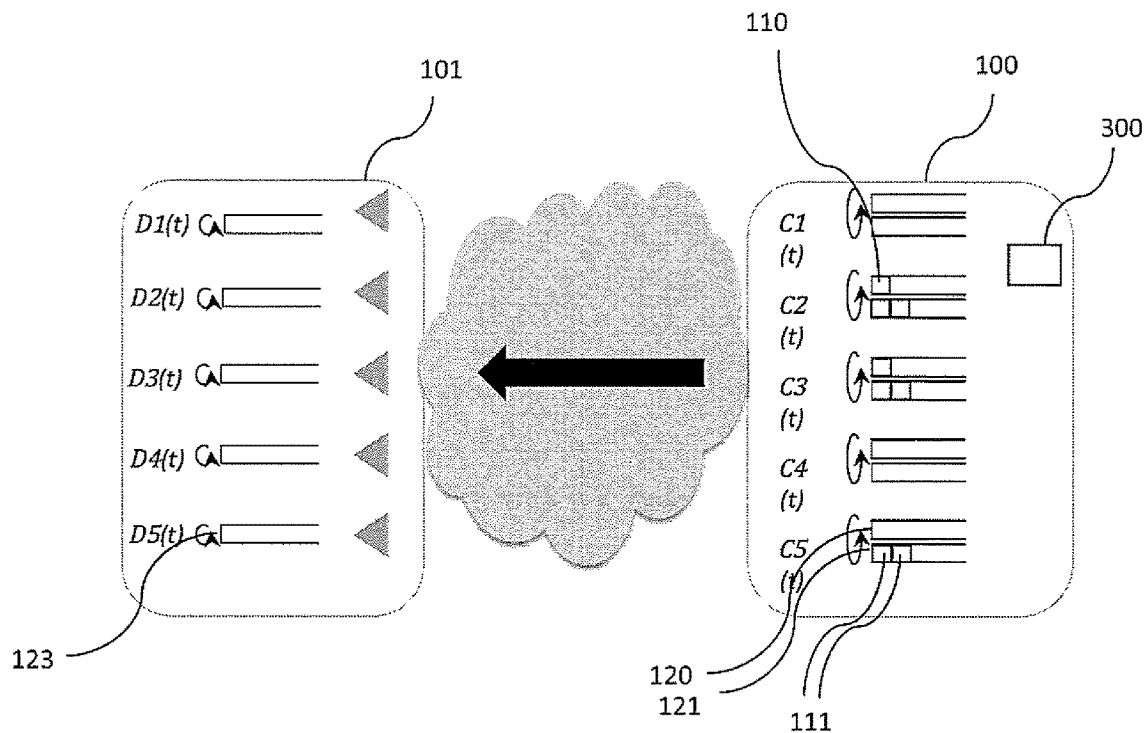

Referring to FIGS. 3a and 3b we shall now describe the effects of a method for processing data packets on the filling of the queues of a network node according to particular embodiments of the invention.

Figure 1:
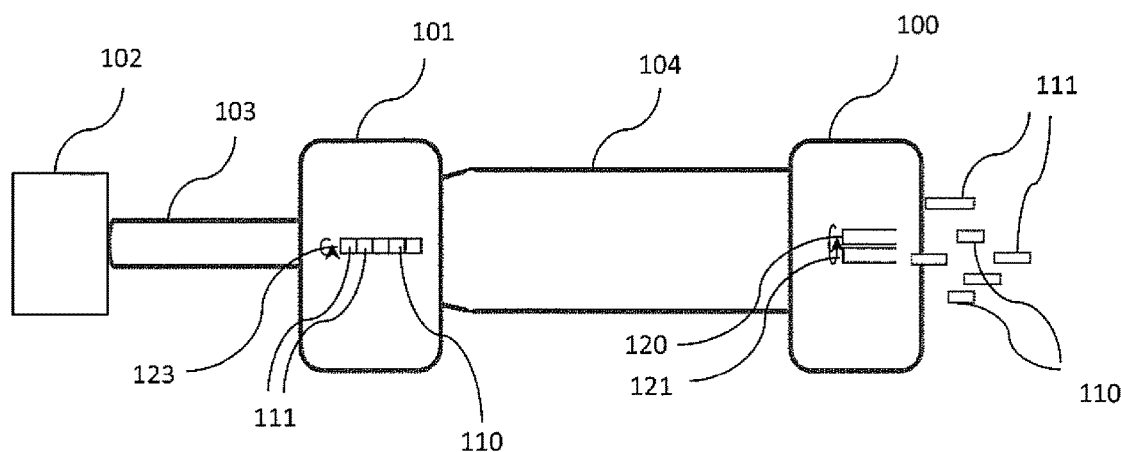
FIG. 1 represents the packet traffic intended for a user in a prior-art network configuration.

More particularly, FIG. 3a represents a downstream node 101 that does not have quality-of-service management functions as represented with reference to FIG. 1 relating to the known type of configuration. This node therefore manages only one queue for all the packets addressed to a same intended recipient whatever the priority of these packets. On the contrary, according to this embodiment, the upstream network node 100 has quality-of-service management functions such as these. For example, it can be a service access device forming part of a fixed network or else a packet data network gateway or a fixed/mobile convergent gateway in the case of a cell network. As presented with reference to FIG. 1, this upstream node is then capable of managing several queues with the aim of managing the effects of the packets intended for the same recipient as a function of a criterion of priority, for example the DSCP marking of their header if they are packets coming from the Internet protocol. More specifically, according to this embodiment, one queue 120 is dedicated to the management of high priority packets 110 and one queue 121 is dedicated to the management of lower priority packets 111.

Even if the upstream node has a physical flow rate greater than that of the downstream node which the data packets 110, 111 must reach, it appears that the application, by a processing device 300 of the upstream node 100, of the method according to the invention at at least one of the queues of the non-priority packets of the upstream node makes it possible to recreate a congestion in at least this queue by reducing its flow rate. It can be seen then that this upstream node becomes the limiting factor in the transmission of the data packets. This leads to the emptying of the queue of the downstream node.

More specifically, if the method is applied solely to the queue 121 of the upstream node dedicated to the management of the lower priority packets, it can be seen that the flow rate in the queue dedicated to the management of the high priority packets is kept. Thus, this flow rate in the queue of the upstream node dedicated to the management of the high priority packets remains at the value of its physical flow rate while the flow rate in the queue of the upstream node dedicated to the management of the lower priority packets is reduced compared with this same physical flow rate. It can thus be seen that the high priority packets are sent by the upstream node more rapidly than the lower priority packets and that these very same high priority packets no longer risk being rejected by the downstream node because the queue of this downstream node is emptied. This truly improves the quality of service experienced by the end-user.

According to the embodiment shown in FIG. 3b, the method according to the invention can be applied when several users are waiting for data packets travelling through the upstream node 100 and downstream node 101. According to this embodiment, each queue of the downstream node is dedicated to the management of the packets addressed to a particular user. The upstream node then has corresponding queues for the high priority packets or lower priority packets for each user. According to this embodiment, the method is then applied by the processing device 300 to each queue of the upstream node dedicated to the management of the lower priority packets of each user. As in the case of a simple transmission illustrated in FIG. 3a, it can be seen that the application of the method recreates congestion on each file to which it is applied, thereby leading to having the corresponding queue emptied at the downstream node. The high priority packets are thus favored in terms of time lag and, since the queues of the downstream node are emptied, the quality of service is thereby improved for each user.

Figure 4:
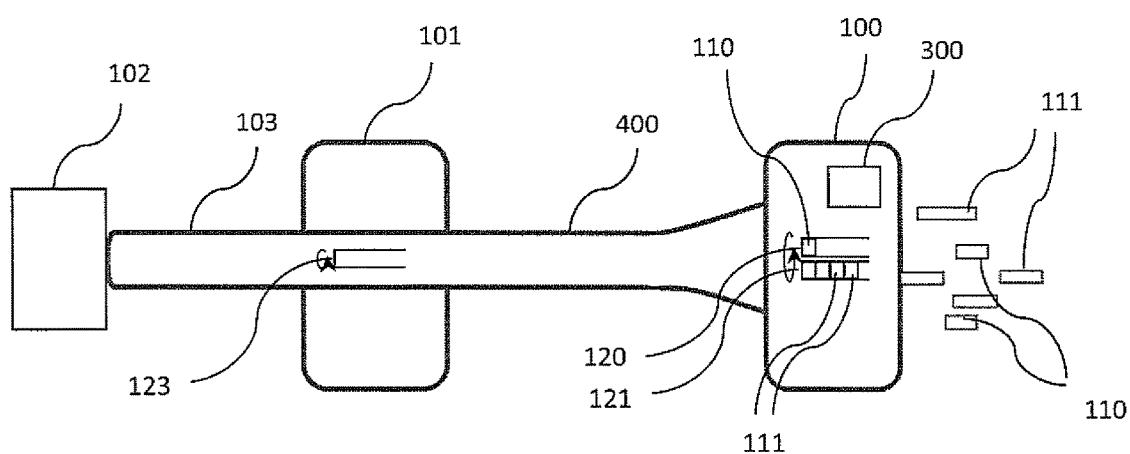
FIG. 4 illustrates the effects of a data packet processing method on the traffic between the network nodes according to one particular embodiment of the invention.

A more detailed description is now provided of the implantation of the method according to the invention in a data transmission network with reference to FIG. 4. In this embodiment, a method according to the invention is implemented in the processing device 300 of the upstream node 100 of a network that implements quality-of-service management functions. As in the known configuration described with reference to FIG. 1, it can for example be a device for access to the service implementing such management functions on the basis of the DSCP marking of the header of the packets transmitted if it is a network implementing the Internet protocol. It can also be a packet data network gateway of the "P-GW" type or a fixed/mobile convergent gateway in the case of cell networks.

On the contrary, the downstream node 101 is devoid of such quality-of-service management functions. It can for example be an old-generation digital subscriber line access multiplexer or the equipment of certain radio stations in radio-relay systems in the case of a fixed network. It can also be an antenna or a base station in the case of cell networks.

Whether it is the case of a fixed network or hat of a cell network, it can be seen that the application of a method according to the invention in the queues of the upstream node reduces the departure rate 400 from this node 100 so that it tends to coincide with the departure rate 103 of the downstream node 101.

Besides, the application of this method to the queues 121 of the upstream node dedicated to the management of lower priority packets 111 reduces the rate of sending of these packets as compared with the rate of sending of the high-priority packets, thus contributing to the improvement of the quality of service experienced by the end-user.

Figure 5:
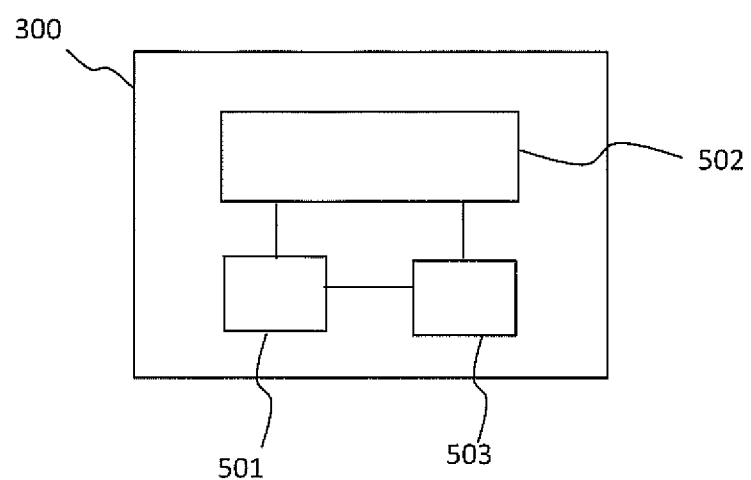
FIG. 5 represents an example of a structure of a processing device enabling the implementation of the method of FIG. 2.

FIG. 5 finally gives an example of a structure of the processing device 300 enabling the implementation of the method of FIG. 2.

The processing device 300 comprises a random-access memory 503 (for example, a RAM), a processing unit 502 equipped for example with a processor and driven by a computer program stored in a read-only memory 501 (for example, a ROM or a hard disk drive). At initialization, the code instructions of the computer program are for example loaded into the random-access memory 503 and then executed by the processor of the processing unit 502.

This FIG. 5 provides only one among several possible ways of performing the algorithm described in detail here above with reference to FIG. 2. Indeed, the technique of the invention can be carried equally well on a reprogrammable computing machine (a PC computer, a DSP processor or a microcontroller) executing a program comprising a sequence of instructions or on a dedicated computation machine (for example a set of logic gates such as an FPGA or ASIC or any other hardware module).

Should the invention be implanted in a reprogrammable computing machine, the corresponding program (i.e. the sequence of instructions) can be stored in a detachable storage medium (such as for example a hard disk drive, a CD-ROM or a DVD-ROM) or a non-detachable storage medium, this storage medium being partially or totally readable by a computer or a processor.

The invention claimed is:

1. A method for processing data packets received by a network node called an upstream node and intended for transmission to a terminal by a network node called a downstream node through a communications link, said upstream node comprising a queue of non-priority data packets intended for said terminal, able to store a predetermined number of data packets before they are transmitted to the downstream node, wherein the method comprises the following acts performed by the upstream node:

obtaining a first piece of information representing a filling state of said queue of the upstream node over a predetermined period of observation;

in response to said first piece of information obtained being a value indicating a filling level of the queue that is lower than or equal to a first predetermined non-zero low threshold, reducing a rate of departure from said queue; and in response to said first piece of obtained information being a value indicating a filling level of the queue that is higher than a first predetermined high threshold higher than or equal to said first low threshold, increasing the rate of departure from said queue.

2. The method according to claim 1, wherein said first piece of information representing the filling state of said queue is obtained by using a method of active queue management.

3. The method according to claim 1, wherein said first piece of information belongs to a group consisting of:

an estimation of a time taken to cross said queue by one or more data packets over said predetermined period of observation;

an estimation of a filling level of said queue over said predetermined period of observation.

4. The method according to claim 1, further comprising the following sub-acts:

in response to said first piece of obtained information being the value indicating the filling level of the queue higher than said first high threshold:

obtaining a second piece of information representing a present instant; and in response to said second piece of information obtained representing the present instant prior to a preliminarily determined date, reducing or maintaining said rate of departure from said queue;

in response to said second piece of information obtained representing the present instant after or equal to said preliminarily determined date, executing said act of increasing the rate of departure from said queue.

5. The method according to claim 1, wherein said rate of departure from said queue is a function of an arrival rate of the packets entering said queue.

6. The method according to claim 5, wherein said arrival rate of the packets entering said queue depends, through a method for managing the end-to-end quality of service, on a rate of departure from said downstream node.

7. The method according to claim 1, wherein said upstream node is a wideband access server and said downstream node is a digital subscriber line access multiplexer.

8. The method according to claim 1, wherein said upstream node is a packet data network gateway or a convergent gateway and said downstream node is an antenna or a base station.

9. A non-transitory computer-readable medium storing a computer program product comprising program code instructions, which when executed by a network node called an upstream node, configure the upstream node to implement a method for processing data packets received by the upstream node and intended for transmission to a terminal by a network node called a downstream node through a communications link, said upstream node comprising a queue of non-priority data packets intended for said terminal, able to store a predetermined number of data packets before they are transmitted to the downstream node, wherein the method comprises:

obtaining a first piece of information representing a filling state of said queue of the upstream node over a predetermined period of observation;

in response to said first piece of information obtained being a value indicating a filling level of the queue that is lower than or equal to a first predetermined non-zero low threshold, reducing a rate of departure from said queue; and in response to said first piece of obtained information being a value indicating a filling level of the queue that is higher than a first predetermined high threshold higher than or equal to said first low threshold, increasing the rate of departure from said queue.

10. An upstream network node called an upstream node configured to implement a method for processing data packets received by the upstream node and intended to be transmitted to a terminal by a network node called a downstream node through a communications link, said upstream node comprising a queue of non-priority data packets intended for said terminal, capable of storing a predetermined number of data packets before their transmission to the downstream node, wherein said upstream node comprises:

a reprogrammable computing machine or a dedicated computation machine, configured to perform acts comprising:

obtaining a first piece of information representing a filling state of said queue of the upstream node over a predetermined period of observation;

reducing a rate of departure from said queue in response to said first piece of information obtained being a value indicating a filling level of the queue lower than or equal to a first predetermined non-zero low threshold; and increasing said rate of departure from said queue in response to said first piece of information obtained being a value indicating a filling level of the queue higher than a first predetermined high threshold higher than or equal to said first low threshold.

* * * * *